US011952092B2

(12) United States Patent
Sjöblom et al.

(10) Patent No.: US 11,952,092 B2
(45) Date of Patent: Apr. 9, 2024

(54) PROPULSION UNIT FOR A MARINE VESSEL

(71) Applicant: VOLVO PENTA CORPORATION, Gothenburg (SE)

(72) Inventors: Lars Sjöblom, Västra Frölunda (SE); Mikael Åsberg, Torslanda (SE); Mathias Åström, Gothenburg (SE)

(73) Assignee: VOLVO PENTA CORPORATION, Gothenburg (SE)

( * ) Notice: Subject to any disclaimer, the term of this patent is extended or adjusted under 35 U.S.C. 154(b) by 141 days.

(21) Appl. No.: 17/649,275

(22) Filed: Jan. 28, 2022

(65) Prior Publication Data

US 2022/0258844 A1 Aug. 18, 2022

(30) Foreign Application Priority Data

Feb. 12, 2021 (EP) .................................... 21156729

(51) Int. Cl.
*B63H 20/26* (2006.01)
*F02B 61/04* (2006.01)
*B63H 23/10* (2006.01)

(52) U.S. Cl.
CPC ........... *B63H 20/26* (2013.01); *F02B 61/045* (2013.01); *B63H 23/10* (2013.01)

(58) Field of Classification Search
CPC ........ B63H 20/26; B63H 23/10; B63H 23/04; B63H 23/12; B63H 23/32; B63H 2005/106; B63H 2005/1256; F02B 61/045; F01N 13/004; F01N 13/12; F01N 2470/14; F01N 2470/16; F01N 2590/02
See application file for complete search history.

(56) References Cited

U.S. PATENT DOCUMENTS 6,468,119 B1 10/2002 Hasl et al.
7,186,157 B2 * 3/2007 Mansson .............. B63H 20/245 440/89 R
7,387,556 B1 * 6/2008 Davis ..................... B63H 20/26 440/89 A (Continued)

FOREIGN PATENT DOCUMENTS

GB 2325910 A 12/1998
WO 2005115835 A1 12/2005

(Continued)

OTHER PUBLICATIONS

European Search Report dated Aug. 13, 2021 in corresponding European Patent Application No. 21156729.2, 8 pages.

*Primary Examiner* — Grant Moubry
(74) *Attorney, Agent, or Firm* — Venable LLP; Jeffri A. Kaminski

(57) ABSTRACT

A propulsion unit for a marine vessel is adapted to receive power from at least one power supply unit. The propulsion unit includes a stationary part adapted to be mounted to a hull of the marine vessel, and a movable part comprising one or more thrust generating devices adapted to transform the received power into a thrust by acting on water carrying the marine vessel. The propulsion unit is adapted to receive exhaust gases from at least two internal combustion engines, wherein the movable part is adapted to release the exhaust gases into the water.

14 Claims, 7 Drawing Sheets

(56) References Cited

U.S. PATENT DOCUMENTS

| | | | | |
|---|---|---|---|---|
| 8,808,045 | B2 * | 8/2014 | Lundqvist | F01N 13/12 440/89 R |
| 9,114,864 | B2 * | 8/2015 | Schlintz | B63H 20/02 |
| 9,896,982 | B1 * | 2/2018 | Zhang | F02D 25/04 |
| 10,214,272 | B2 * | 2/2019 | Maniero | B63H 21/14 |
| 10,239,599 | B1 | 3/2019 | Biel et al. | |
| 11,008,926 | B1 * | 5/2021 | Osthelder | F01N 13/12 |
| 2004/0121666 | A1 * | 6/2004 | Okuyama | F02N 11/0803 440/85 |
| 2021/0040884 | A1 * | 2/2021 | Hoffmann | F01B 21/02 |

FOREIGN PATENT DOCUMENTS

| | | | | |
|---|---|---|---|---|
| WO | 2010107345 | A1 | 9/2010 | |
| WO | WO-2015003855 | A1 * | 1/2015 | B63H 1/14 |
| WO | 2020083494 | A1 | 4/2020 | |

* cited by examiner

PROPULSION UNIT FOR A MARINE VESSEL

TECHNICAL FIELD

The invention relates to a propulsion unit for a marine vessel. The invention also relates to a propulsion system comprising a propulsion unit, and to a marine vessel comprising a propulsion system.

The invention is not restricted to any particular type of marine vessel. Instead it may be used on any type and any size of marine vessel, in particular water surface vessels.

BACKGROUND

Propulsion units for marine vessels are known, in which the propulsion unit comprises a stationary part adapted to be mounted to a hull of the marine vessel, and a movable part comprising one or more propellers. It is also known, from WO2020083494A1, that such a propulsion unit may be adapted to receive power from two internal combustion engines. An advantage thereby is that the engine size may be reduced, which allows the use of readily available engines for relatively large power requirements.

There is nevertheless a desire to provide a manner of handling exhausts from the engines which is beneficial from a noise control point of view, and from a design and installation point of view. For example, spaces for propulsion engines in marine vessels, in particular relatively large vessels, e.g. 25-50 meter vessels, may differ in layout from one vessel to another. The exhaust system design may involve arranging for exhausts to be emitted through a transom, or a hull side, and arranging mufflers, and secure hull penetrations. The design of the exhaust systems for such relatively large vessels, which may be commercial vessels or private yachts, are guided by extensive sets of regulations. All this contributes to making the exhaust system design and installation complicated.

SUMMARY

An object of the invention is to provide a manner of handling exhausts from the engines which is beneficial from a noise control point of view, from a design point of view, and/or from an installation point of view.

The object is reached with a method according to claim 1. Thus, the object is reached with a propulsion unit for a marine vessel,

- adapted to receive power from at least one power supply unit,
- wherein the propulsion unit comprises a stationary part adapted to be mounted to a hull of the marine vessel, and a movable part comprising one or more thrust generating devices adapted to transform the received power into a thrust by acting on water carrying the marine vessel,
- wherein the propulsion unit is adapted to receive exhaust gases from at least two internal combustion engines, wherein the movable part is adapted to release the exhaust gases into the water.

Embodiments of the invention allow for exhausts from the engines to be released in the water carrying the vessel. Thereby, noise levels from the engines may be reduced. Also, the smell of exhaust gases may be reduced for persons on the vessel. In addition, where the one or more thrust generating devices are one or more propellers, the exhaust gases may be transported with the propeller slip stream, allowing them to be transported relatively far from the vessel before emerging to the water surface.

Further, where the engines are in the vicinity of the propulsion unit, the exhausts may travel a relatively short distance in the vessel, which allows a relative short piping arrangement for the exhausts. This reduces requirements on space, and installation time. It also reduces the complexity of the engine installation. In addition, no separate cutout in the hull is needed for guiding the exhaust gases, since the hull cutout for the propulsion unit is used also for the exhaust gases. Further, exhaust systems may be designed to fit vessels with different layout of engine rooms, which may greatly simplify the exhaust system installation process.

The propulsion unit may be a pod drive. A pod drive, exemplified below, is herein understood as a propulsion unit which extends through the bottom of the hull, e.g. as opposed through the transom. However, in some embodiments, the propulsion unit may be a stern drive.

The one or more thrust generating devices may be adapted to be in contact with the water carrying the marine vessel. The thrust provided by the one or more thrust generating devices may provide a propulsive force to the vessel. The movable part may be rotatable in relation to the stationary part around a rotation axis for adjusting the direction of the thrust in relation to the hull. Thereby, a steering action of the marine vessel may be provided.

The stationary part may be mounted to the hull in an opening in the hull. The stationary part may be flexibly mounted to the hull. For example, one or more sealing rings may be provided between the stationary part and the hull. The sealing rings may extend along a periphery of the opening in the hull through which the stationary part extends. The sealing rings may allow minor movements of the stationary part in relation to the hull. Thereby, the sealing rings may provide a flexible mounting of the stationary part. The sealing rings may also be arranged to seal between the stationary part and the hull. However, in some embodiments, the stationary part may be fixed to the hull, e.g. by bolting or adhesive.

The at least one power supply unit, from which the propulsion unit is adapted to receive power, may be said at least two internal combustion engines. Thereby, the propulsion unit is adapted to receive power from at least two power supply units. Thus, the propulsion unit may be adapted to receive power from the at least two internal combustion engines. Thereby, the propulsion unit may be a pod drive, in which a drive shaft extends through the hull to an output transmission outside of the hull, from which output transmission one or more propeller shafts extend to respective propellers. The drive shaft may be mainly perpendicular to a local extension of the hull where the propulsion unit is installed. If the hull is locally horizontal where the propulsion unit is installed, the drive shaft may be mainly vertical. The one or more propeller shafts may be mainly horizontal when the propulsion unit is installed in a vessel.

However, in some embodiments, the propulsion unit is adapted to receive electrical power from at least one power supply unit. For example, where the propulsion unit is a pod drive, the propulsion unit may comprise one or more electric motors for driving the one or more thrust generating devices. Thereby, the propulsion unit may be adapted to receive electrical power for driving the one or more electric motors. Thereby, the at least one power supply unit may be one or more electrical generators. Thereby, the at least two internal combustion engines may be arranged to drive the one or more electrical generators.

In some embodiments, the propulsion unit is adapted to receive power from a parallel hybrid drivetrain. Thereby, an electric motor may be arranged between one of, or a respective of, the engines. In some embodiments, one or both of the engines may be arranged to supply auxiliary power in the vessel, In preferred embodiments, the propulsion unit is adapted to receive exhaust gases from two internal combustion engines. The exhaust gases may in some embodiments contain a coolant.

Preferably, the propulsion unit comprises two unit inlets each adapted to receive exhaust gases from a respective of two engines. Thereby, exhaust gases from the engines may be guided separately from the engines to the propulsion unit. This excludes mixing of the exhaust paths before they reach the propulsion unit. Thereby, a risk of exhaust gases from one of the engines being pushed into the other of the engines is reduced or eliminated. For example, where only one of the engines is operating, there may be no back pressure in the exhaust passage of the other engine. Thereby, where the exhaust passages are connected, exhausts from the one of the engines may reach the another of the engines. Thereby, damages, e.g. of an exhaust treatment system of the exhaust receiving engine, may occur. By the propulsion unit comprising two unit inlets each adapted to receive exhaust gases from a respective of two engines, the risk of such damages is reduced or eliminated. Also, this risk is reduced without the need for valves etc. in the exhaust passages. Thereby, a robust engine installation is allowed.

Preferably, the movable part comprises at least one unit outlet for releasing the exhaust gases into the water, and the propulsion unit is adapted to keep the exhaust gases separate along at least a part of the distance between the unit inlets and the unit outlet. Thereby, the exhaust gases remain separated along at least a part of the distance through the propulsion unit. Thereby, the risk of exhaust from one of the engines reaching another of the engines is further reduced. In some embodiments, there is a single unit outlet. In some embodiments, there are two unit outlets, one for each unit inlet.

Preferably, the stationary part comprises two stationary exhaust conduits each extending from a respective of the unit inlets to the movable part. Thereby, the stationary part comprises two stationary outlets adapted to deliver the exhaust gases to the movable part. Thereby, the exhaust gases are kept separate through the stationary part. Thereby, the risk of exhaust from one of the engines reaching another of the engines is further reduced.

In some embodiments, the movable part comprises two movable inlets each adapted to receive exhaust gases from a respective of the stationary outlets. Thereby, two movable exhaust conduits may be provided in the movable part. Thereby, the exhaust gases may be kept separate through the movable part. Thereby, the risk of exhaust from one of the engines reaching another of the engines is further reduced.

In some embodiments, the movable part comprises at least one movable inlet adapted to receive exhaust gases from the stationary outlets. In addition to a radial direction, the at least one movable inlet extend in a circumferential direction in relation to the rotational axis of the movable part. Similarly, in addition to a radial direction the stationary outlets extend in a circumferential direction in relation to the rotational axis. Preferably, the extension in the circumferential direction of the at least one movable inlet is larger than the extension in the circumferential direction of the stationary outlets.

Thereby, the at least one movable inlet may fully overlap the stationary outlet within an angular interval of the movable part rotation. Thereby, the transport of the exhaust gases to the movable part is secured through the angular interval. The interval may consist of two angular distances in opposite directions from the neutral position for straight forward travel. Each angular distance may be for example within 4-10 degrees.

The at least one movable inlet may extend in the circumferential direction between delimiting sidewalls of the movable part. Thereby, in the event of large steering angles, e.g. at harbor maneuvers, at least some of the exhaust gases may be emitted from the stationary part directly into the surrounding water, outside of the movable part. Even if the exhaust gases are emitted outside of the movable part, with the separation in the stationary part of the exhaust gases from the engines, the risk of exhaust gases from one of the engines reaching the other engine is nevertheless reduced or eliminated.

In some embodiments, the unit inlets, which are each adapted to receive exhaust gases from a respective of two engines, are located at separate positions in a circumferential direction in relation to the rotation axis. Thereby, where the stationary outlets are located at separate positions in a radial direction in relation to the rotation axis, a stationary wall separating the stationary exhaust conduits may be twisted along the stationary exhaust conduits.

The unit inlets and the stationary outlets may be arranged to be located behind the rotational axis in relation to a direction of straight forward travel of the vessel. Thereby, the unit inlets may be located at substantially the same radial distance from the rotational axis of the movable part. The unit inlets may be arranged to be located on opposite sides of an imaginary plane which coincides with the rotational axis and which coincides with the direction of vessel straight forward travel. The unit inlets may be located at substantially the same radial distance from the rotational axis of the movable part. Thereby, the extension of the propulsion unit in the direction of vessel straight forward travel may be kept relatively short. This is beneficial from a space saving point of view. It may also reduce the size of an opening or a cut-out in the vessel hull for the stationary part of the propulsion unit.

In addition, the stationary outlets being located at separate positions in a radial direction in relation to the rotation axis, allows the stationary outlets to extend within the same circumferential intervals. Thereby, it may be secured that exhaust gases from both engines reach the movable part within an angular interval of rotation of the movable part.

It should be noted that in alternative embodiments, the unit inlets are located at the same circumferential position, albeit at different radial distances from the rotational axis. In further embodiments, the unit inlets are located in different circumferential positions, and at different radial distances from the rotational axis.

Preferably, where the stationary part comprises a stationary wall separating the stationary exhaust conduits, the distance, at the movable part, from the rotation axis to the stationary wall is constant along the stationary wall. Thereby, the stationary wall may be curved. Thereby, where the movable part comprises two movable exhaust conduits, and the movable part comprises a movable wall separating the movable exhaust conduits, the movable wall may coincide, at the stationary part, as seen along the rotation axis, with the stationary wall. Thereby, the movable wall may be curved.

Thereby, similar to the distance from the rotation axis to the stationary wall, the distance, at the movable part, from the rotation axis to the movable wall may be constant along the movable wall. Thereby, the distance from the rotation axis to the stationary wall, and the distance from the rotation axis to the movable wall, may be the same. Thereby, it may be secured that the stationary wall and the movable wall radially overlap. Thereby, the separation of the exhaust gases at the interface between the stationary and movable parts may be secured throughout an interval of rotation of the movable part.

However, in some embodiments, the stationary wall and/or the movable wall may have a width, at the interface between the stationary and the movable parts, which is large enough to secure the separation of the exhaust gases throughout an interval of rotation of the movable part. I.e., the stationary wall and/or the movable wall may have an extension in the radial direction of the movable part, which secures an overlap between the walls throughout the interval of rotation of the movable part. For this, one or both of the walls may be widened at the interface, e.g. gradually and/or by a flange.

It is understood that the movable exhaust conduits may each extend from the stationary part towards the at least one unit outlet.

Preferably, the propulsion unit comprises a seal at an interface between the stationary part and the movable part, the seal being adapted to seal exhaust gases guided by one of the stationary exhaust conduits, and by one of the movable exhaust conduits, from exhaust gases guided by the other of the stationary exhaust conduits, and by the other of the movable exhaust conduits. Thereby, the separation of the exhaust gases at the interface between the stationary and movable parts may be further secured throughout the interval of rotation of the movable part.

In some embodiments, the movable part comprises two movable exhaust conduits, each adapted to receive exhaust gases from a respective of the stationary exhaust conduits, wherein the movable exhaust conduits terminate at a respective of two unit outlets for releasing the exhaust gases into the water. Thereby, the two unit outlets may be arranged to be distributed substantially transversally in relation to the movable part rotation axis.

The movable part rotation axis may be substantially perpendicular to the local extension of hull where the propulsion unit is installed. In some examples, the rotation axis may be mainly vertical when the propulsion unit is installed in a vessel. This may be the case if the propulsion unit is installed in a substantially horizontal bottom part of the hull. Thereby, the two unit outlets may be arranged to be distributed substantially horizontally. However, where the propulsion unit is installed in a part of the hull which is at a non-zero angle to horizontal, e.g. in a so-called deadrise of the hull, the movable part rotation axis may extend at a non-zero angle to vertical. This angle may be e.g. 0-30 degrees, or 0-22 degrees, for example about 15 degrees. Nevertheless, at such angles, the vertical overlap of the unit outlets may be small.

By the non-existing, or small, vertical overlap of the unit outlets, when the vessel is not moving, and only one of the engines is operating, the risk of exhaust gases from the operating engine entering the exhaust path of the non-operating engine, is eliminated. More specifically, in such a situation, the exhaust gases exiting any of the outlets will rise in the surround water, without passing the other of the unit outlets.

Advantageously, where the movable part comprises a movable wall separating the movable exhaust conduits, and the unit outlets are formed at least partly by the movable wall, at least a lower part of the movable wall is removable. Thereby, the unit outlets may be joined to form an opening for access to a thrust generating device drive assembly of the movable part.

The object is also reached with a propulsion system comprising a propulsion unit according to any embodiment of the invention, and two internal combustion engines, the engines both being arranged to deliver power to the propulsion unit. Thereby, the propulsion unit preferably comprises, as suggested above, two unit inlets each adapted to receive exhaust gases from a respective of two engines. However, in some embodiments, while the propulsion unit is adapted to receive exhaust gases from the engines, the exhaust passages from the engines may be arranged to bring the exhaust gases from the engines together upstream of the propulsion unit.

The object is also reached with a marine vessel comprising a propulsion system according to any embodiment of the invention.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples. In the drawings.

DETAILED DESCRIPTION OF EXAMPLE EMBODIMENTS OF THE INVENTION

Figure 1:
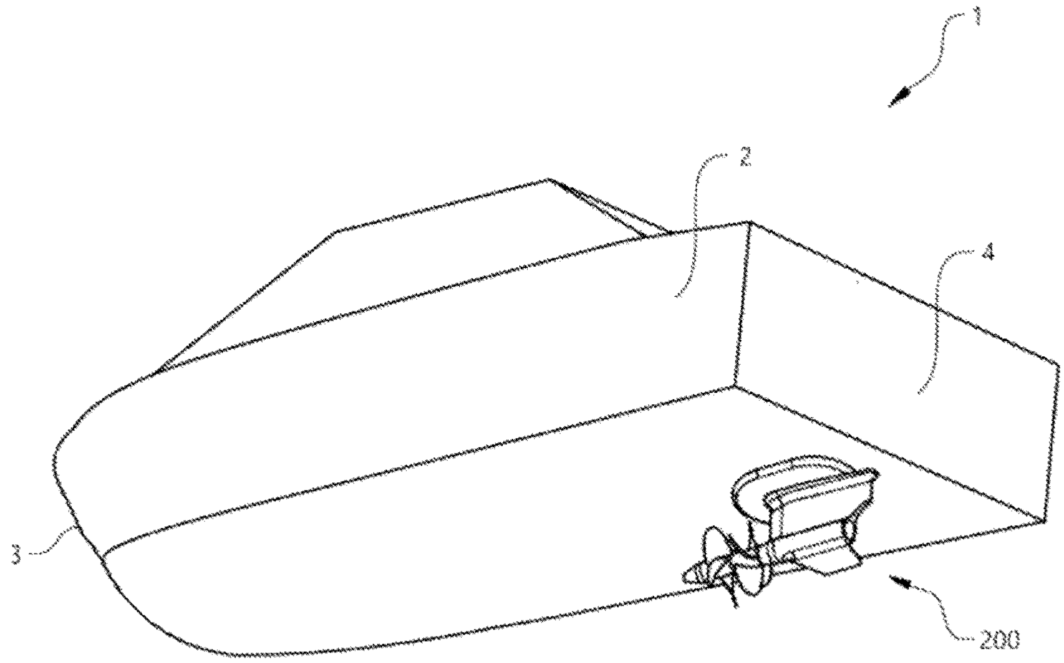
FIG. 1 is a perspective view from below of a marine vessel comprising a propulsion system comprising a propulsion unit according an embodiment of the invention.

FIG. 1 shows a marine vessel 1 in the form of a power boat. It should be noted that the invention is equally applicable to other types of marine vessels, such as ships or sailing yachts. The marine vessel 1 comprises a hull 2 having a bow 3 and a stern 4. The marine vessel 1 further comprises a propulsion system with a propulsion unit 200 according to an embodiment of the invention. In this example, the propulsion unit is a pod drive.

Figure 2:
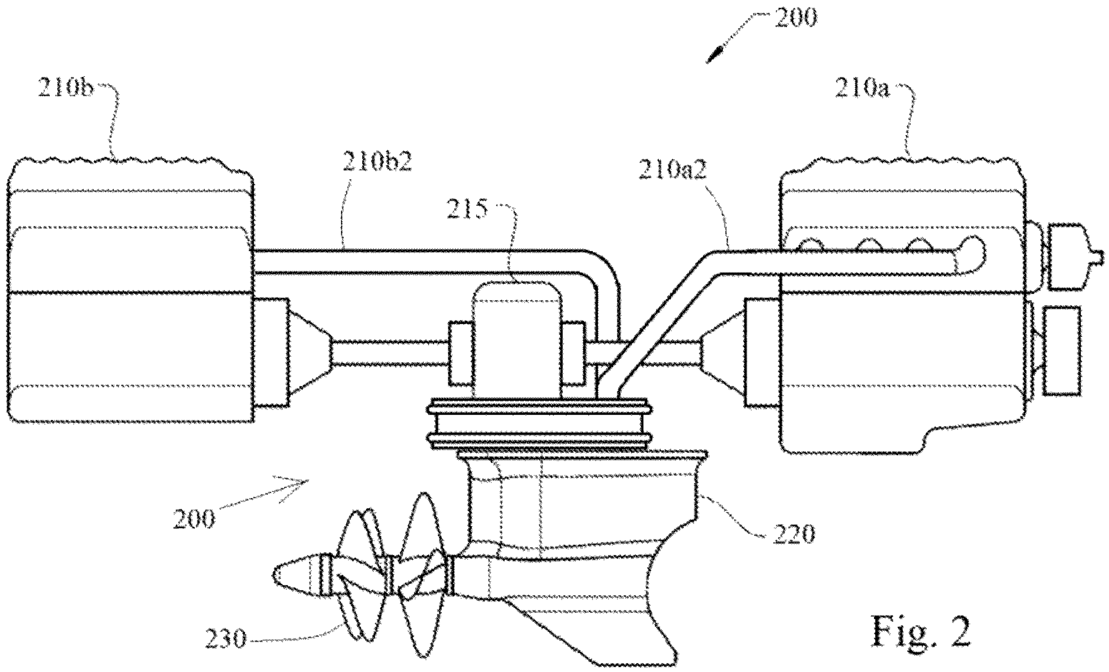
FIG. 2 is a side view of the propulsion system of the marine vessel in FIG. 1.

Reference is made also to FIG. 2. The propulsion unit 200 comprises a stationary part 215 adapted to be mounted to the hull of the marine vessel. The stationary part comprises an intermediate housing 2153. The intermediate housing is adapted to be mounted to the hull, in a cutout of the hull. The cutout is below the waterline of the hull. Sealing rings 2154 are provided to seal between the intermediate housing and the hull.

The propulsion unit also comprises a movable part 220. The movable part is adapted to be immerged in water carrying the marine vessel. The propulsion system comprises two internal combustion engines 210*a*, 210*b*. In this embodiment, the engines form respective power supply units, adapted to deliver mechanical power to the propulsion unit 200. In this embodiment, the engines are, in relation to a direction of straight forward travel of the marine vessel, located forward and behind the propulsion unit 200.

The movable part comprises two thrust generating devices in the form of propellers 230, adapted to transform the received power into a thrust by acting on the water carrying the marine vessel. The propellers are coaxially arranged, and counter-rotating. However, the invention is equally applicable to propulsion units with a single propeller. The propellers are in this embodiment pulling propellers. However, the invention is equally applicable to propulsion units with one or more pushing propellers. It should be also be noted that the invention is equally applicable to other types of propulsion units, such as stern drives.

Figure 3:
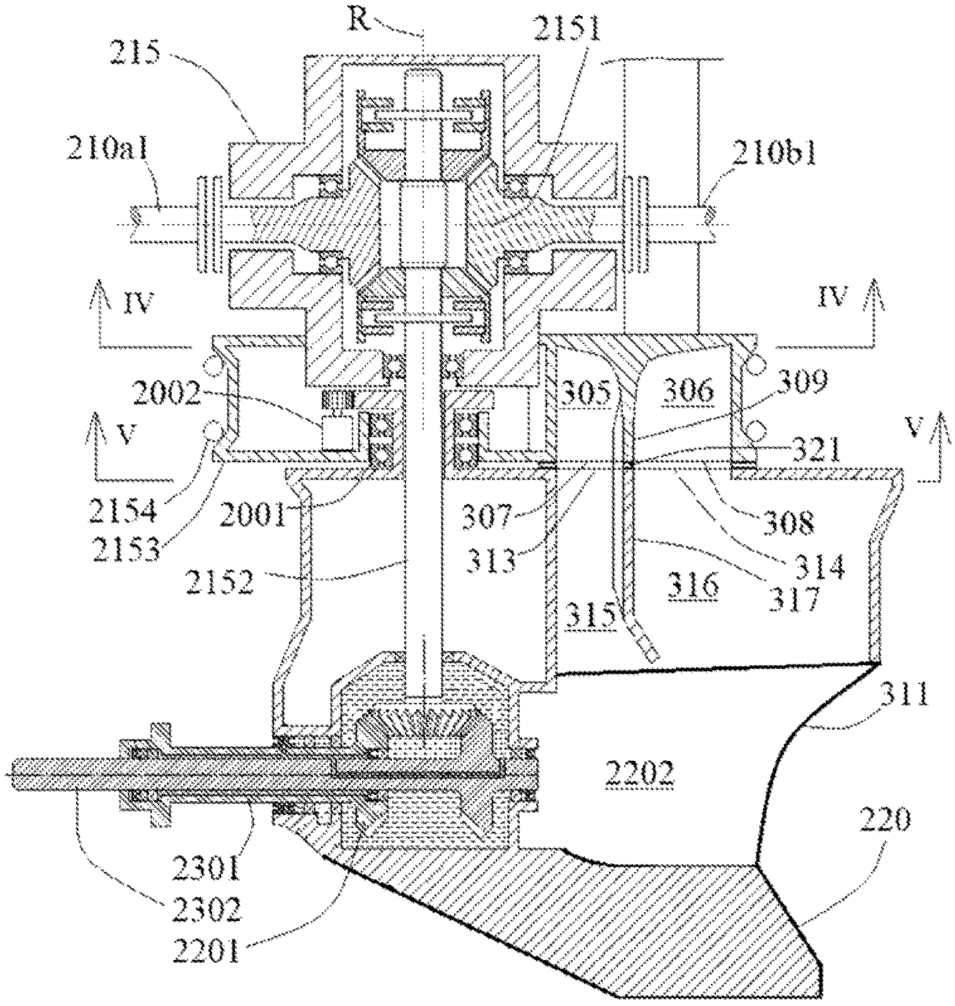
FIG. 3 is a cross-sectional view of the propulsion unit of the marine vessel in FIG. 1, the section coinciding with propeller axes and driveshafts of the propulsion unit.

Reference is made also to FIG. 3. The movable part 220 is rotatable in relation to the stationary part 215 around a rotation axis R for adjusting the direction of the thrust in relation to the hull. For this, the propulsion unit comprises a rotation bearing arrangement 2001. The movable part is arranged to be rotated by means of one or more rotation actuators, e.g. in the form of one or more electrical motors 2002 and a cog engagement. The one or more rotation actuators may be controllable by an electronic control unit (not shown) in dependence on signals from a user maneuvering device such as a steering wheel (not shown). The control unit may comprise computing means such as a CPU or other processing device, and storing means such as a semiconductor storage section, e.g., a RAM or a ROM, or such a storage device as a hard disk or a flash memory.

The stationary part 215 comprises an input transmission 2151 for transferring power from respective power supply unit output shafts 210*a*1, 210*b*1, to an intermediate drive shaft 2152 of the power unit. The power supply units 210*a*, 210*b* may be disengageably connectable to the input transmission, e.g. by means of respective disc clutches, such as e.g. dry or wet plate clutches, centrifugal clutches, overrunning clutches, and/or electromagnetic clutches. The input transmission 2151 may be provided as described in WO2020083494A1, incorporated herein by reference. Such a transmission has two output gears and two clutches for reversing the rotational direction of the intermediate drive shaft 2152. However, it should be noted that the input transmission may be provided in any suitable way. For example, reversing gears may be provided between the engines and the propulsion unit. Thereby, the input transmission may be provided with a single output gear, and no clutch.

In use, the intermediate drive shaft 2152 may be substantially perpendicular to a local extension of the hull where the propulsion unit is installed. The intermediate drive shaft 2152 extends from the stationary part 215 to into the movable part 220. The intermediate drive shaft 2152 is coaxial with the rotation axis R. The movable part 220 comprises an output transmission 2201 arranged to transfer power from the intermediate drive shaft 2152 to two final drive shafts 2301, 2302, each arranged to transfer respective portions of the power to a respective of the thrust generating devices 230. The intermediate shaft preferably comprises two shaft parts, connected with a spline sleeve (not shown).

The propulsion unit is adapted to receive exhaust gases from the engines 210*a*, 210*b*, and the movable part 220 is adapted to release the exhaust gases into the water.

Figure 4:
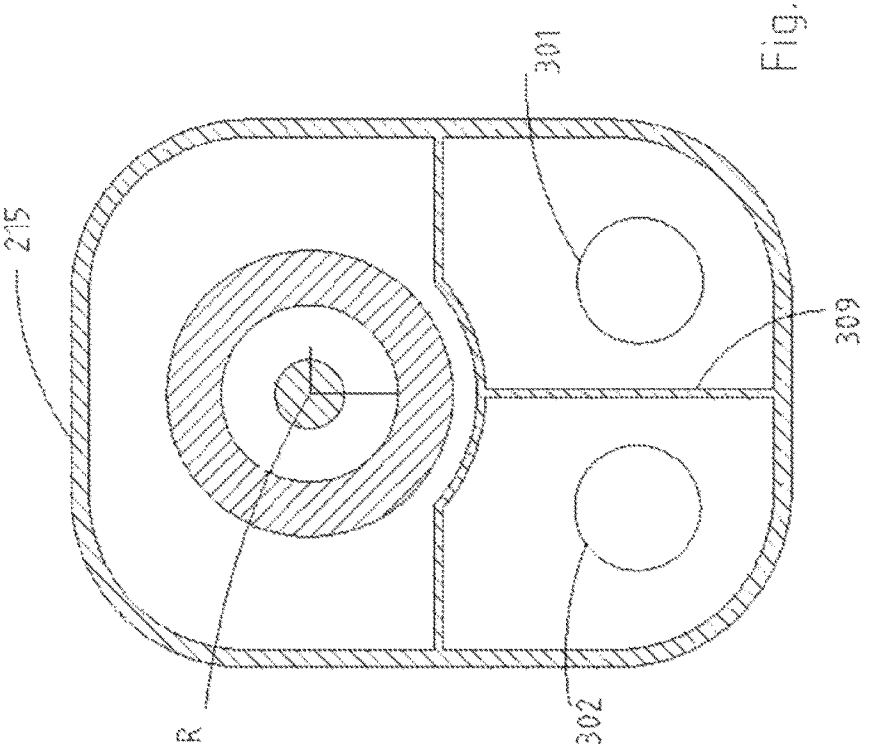
FIG. 4 is a cross-sectional view of the propulsion unit with the section oriented as indicated by the arrows IV-IV in FIG. 3.

Reference is made also to FIG. 4. For receiving the exhaust gases from the engines, the propulsion unit comprises two unit inlets 301, 302. Each unit inlet 301, 302 is adapted to receive exhaust gases from a respective of the engines 210*a*, 210*b*. The delivery of the exhaust gases from the engines, e.g. from exhaust treatment devices thereof, may be done by respective exhaust pipes 210*a*2, 210*b*2, (FIG. 2).

As exemplified in FIG. 3, the stationary part 215 comprises two stationary exhaust conduits 305, 306 each extending from a respective of the unit inlets 301, 302 to the movable part 220.

The stationary part 215 further comprises two stationary outlets 307, 308 adapted to deliver the exhaust gases to the movable part 220. The movable part 220 comprises two movable inlets 313, 314 each adapted to receive exhaust gases from a respective of the stationary outlets 307, 308.

As can be seen in FIG. 4, the unit inlets 301, 302 are located at separate positions in a circumferential direction in relation to the rotation axis R. As can be seen in FIG. 3, the stationary outlets 307, 308 are located at separate positions in a radial direction in relation to the rotation axis R. For this, a stationary wall 309 separating the stationary exhaust conduits 305, 306 is twisted along the stationary exhaust conduits.

Figure 5:
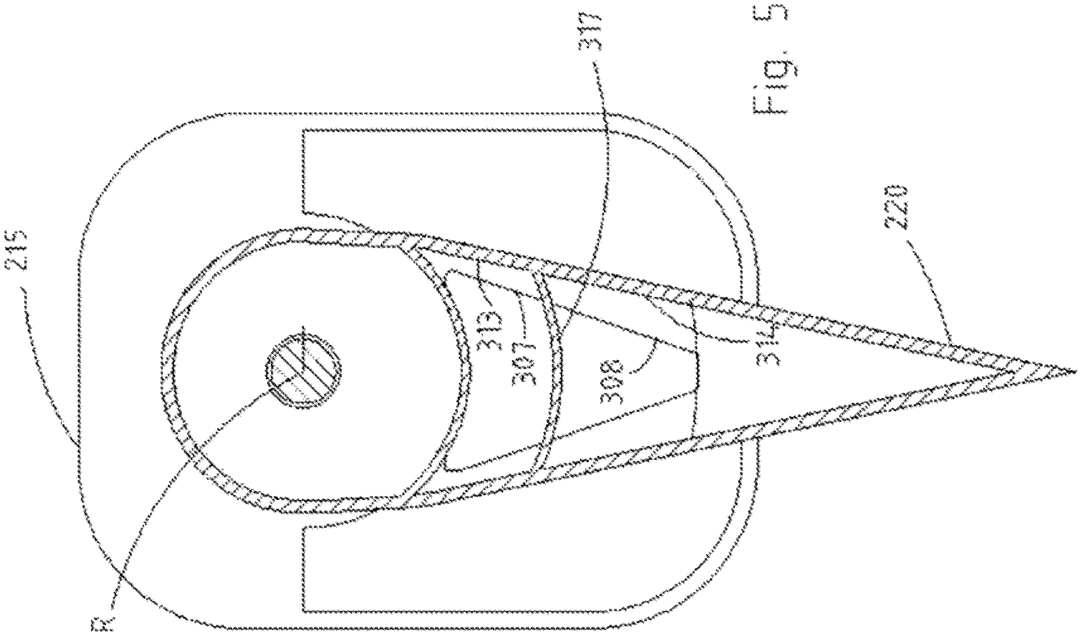
FIG. 5 is a cross-sectional view of the propulsion unit with the section oriented as indicated by the arrows V-V in FIG. 3.
Figure 6:
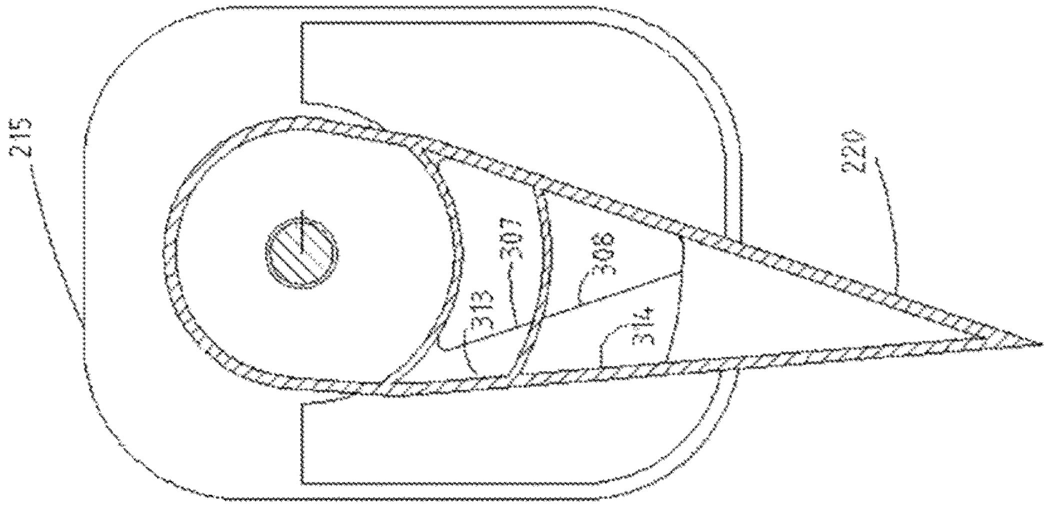
FIG. 6 and FIG. 7 are cross-sectional views of the propulsion unit, with the sections oriented as indicated by the arrows V-V in FIG. 3, where a movable part of the propulsion unit is rotated in relation to a stationary part of the propulsion unit.
Figure 7:
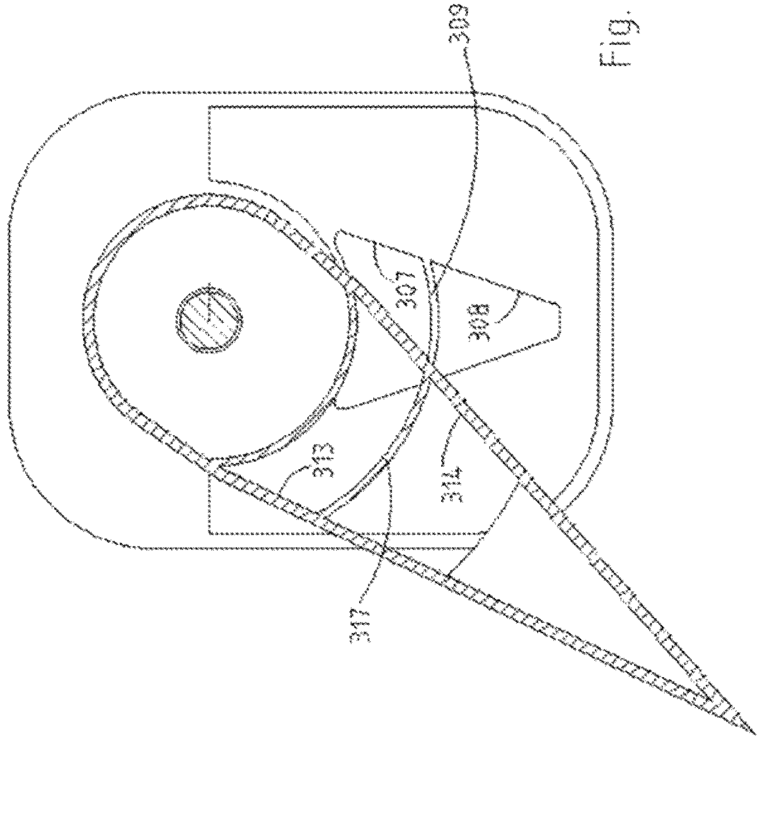

Reference is made also to FIG. 5-FIG. 7. The distance, at the movable part 220, from the rotation axis R to the stationary wall 309 is constant along the stationary wall, (shown in FIG. 7). For this, the stationary wall 309 is at the movable part curved, with a curvature of an imaginary circle passing through the stationary wall 309 and with a center at the rotation axis R.

As can be seen in FIG. 3, the movable part 220 comprises two movable exhaust conduits 315, 316. The movable part comprises a movable wall 317 separating the movable exhaust conduits. As understood from FIG. 5-FIG. 7, the movable wall 317 coincides, at the stationary part 215, as seen along the rotation axis R, with the stationary wall 309. For this, the movable wall 317 is at the stationary part 215 curved, with a curvature which is substantially the same as that of the stationary wall 309 at the movable part 220. Thus, in any rotational position of the movable part 220, the movable wall 317 overlaps, in a radial direction, the stationary wall 309.

As can be seen in FIG. 3, the propulsion unit comprises a seal 321 at the interface between the stationary part 215 and the movable part 220. In this embodiment, the seal is fixed to the stationary part 215. The seal is adapted to seal exhaust gases guided by one of the stationary exhaust conduits 305, 306, and by one of the movable exhaust conduits, from exhaust gases guided by the other of the stationary exhaust conduits, and by the other of the movable exhaust conduits.

The movable part 220 comprises a unit outlet 311 for releasing the exhaust gases into the water. The unit outlet

311 is formed at a rear end of a substantially cylindrically shaped access space 2202 for reaching the propeller drive assembly of the movable part, e.g. for service or repair. The movable wall 317 terminates between the movable inlets 313, 314 and the unit outlet 311. Thus, the propulsion unit is adapted to keep the exhaust gases separate along the distance between the unit inlets 301, 302 and where the movable wall 317 terminates.

As can be seen in FIG. 5-FIG. 7, the extension, in a circumferential direction in relation to the rotational axis R, of the movable inlets 313, 314 is larger than the extension, in the circumferential direction, of the stationary outlets 307, 308. Thereby, the movable part 220 may be rotated while the movable inlets 313, 314 remain fully overlapping the stationary outlets 307, 308. In this example, this full overlap is provided up to a rotation angle of the movable part 220, in relation to a neutral position of the movable part for steering the vessel straight ahead, of about 7 degrees, as illustrated in FIG. 6.

The movable inlets 313, 314 extend in the circumferential direction all the way to delimiting walls of the movable part. As the rotation angle of the movable part 220 increases, the movable part is moved so as to expose the stationary outlets 307, 308 directly to the surrounding water, as illustrated by FIG. 7.

Figure 8:
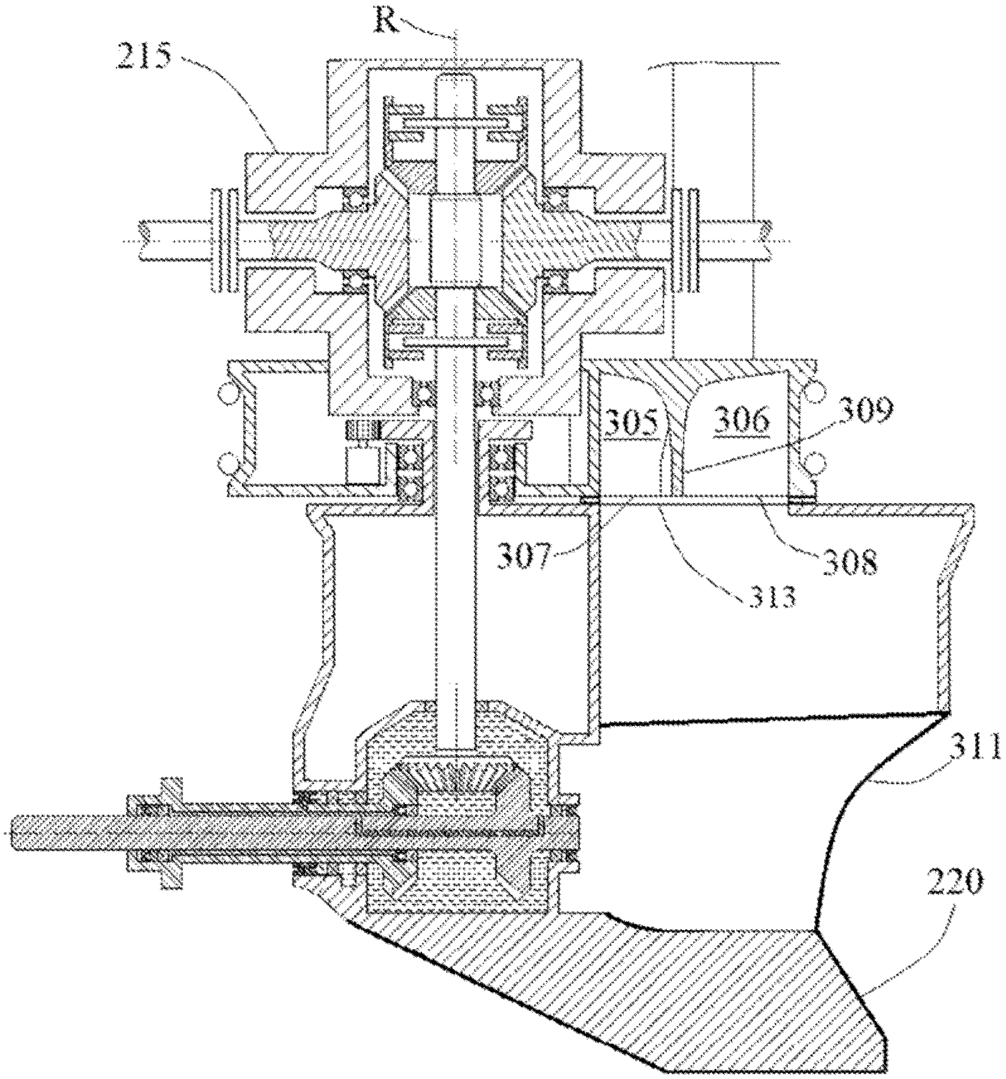
FIG. 8 is a cross-sectional view, similar to the view in FIG. 3, of a propulsion unit according to an alternative embodiment of the invention.

Reference is made to FIG. 8, showing an alternative embodiment of the invention. The embodiment is similar to the one described with reference to FIG. 1-FIG. 7, except for the following. There is no movable wall 317. Instead, the movable part comprises a single movable inlet 313 adapted to receive exhaust gases from both stationary outlets 307, 308. Thus, the propulsion unit is adapted to keep the exhaust gases separate along the distance between the unit inlets 301, 302 and the stationary outlets 307, 308.

Figure 9:
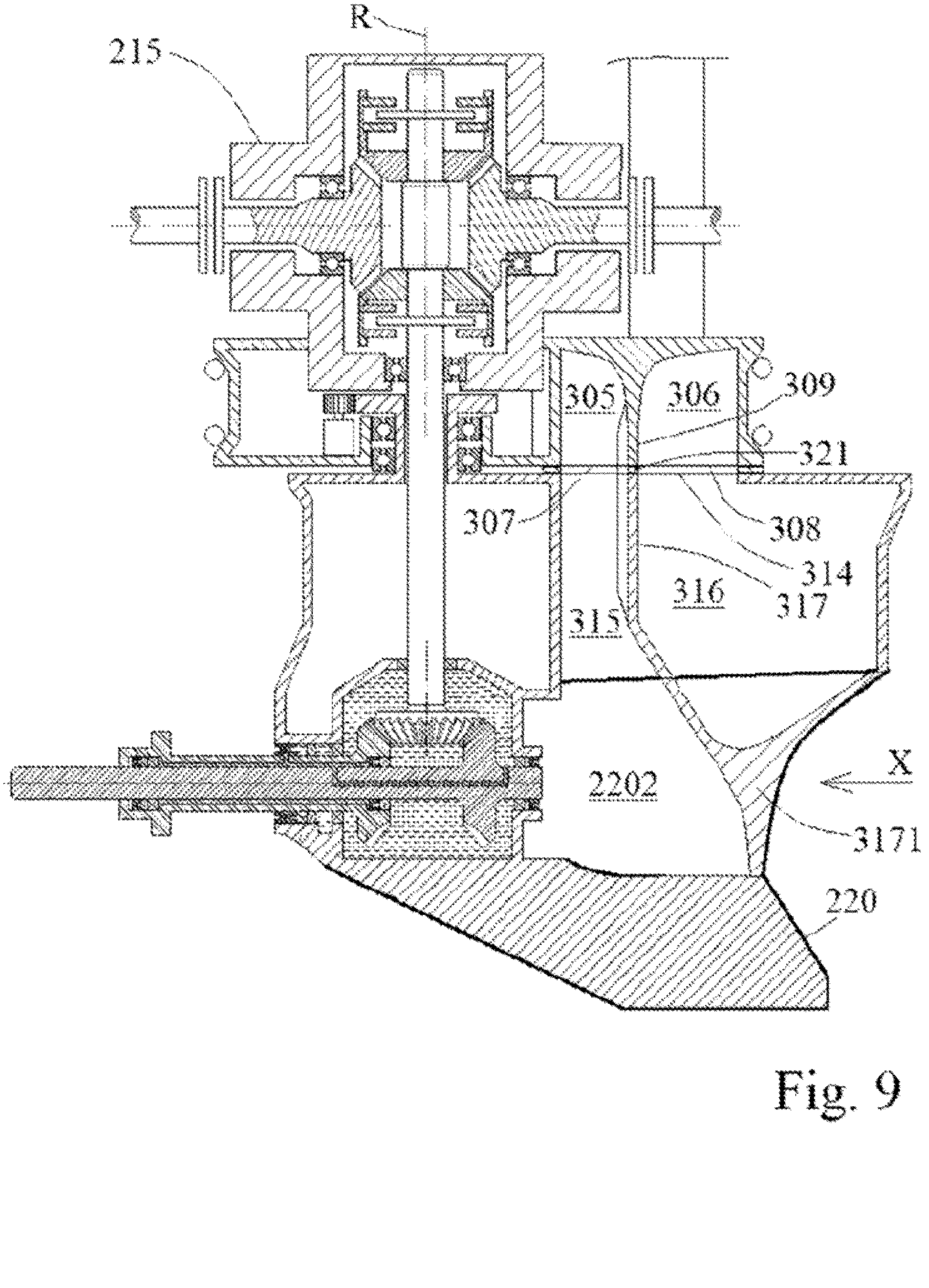
FIG. 9 is a cross-sectional view, similar to the view in FIG. 3, of a propulsion unit according to a further embodiment of the invention.
Figure 10:
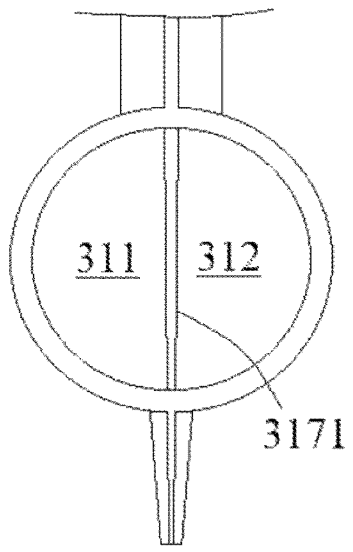
FIG. 10 is a view of a part of the propulsion unit in FIG. 9, from behind as indicated with the arrow X in FIG. 9.

Reference is made to FIG. 9 and FIG. 10, showing a further embodiment of the invention. As the embodiment described with reference to FIG. 1-7, the propulsion unit comprises a movable wall 317. The movable part 220 comprises two unit outlets 311, 312 for releasing the exhaust gases into the water. The unit outlets 311, 312 are formed partly by the movable wall 317. Thus, the propulsion unit is adapted to keep the exhaust gases separate along the distance between the unit inlets 301, 302 and the unit outlets 311, 312.

A lower part 3171 of the movable wall 317 is twisted. At the unit outlets 311, 312, the movable wall 317 extends substantially in parallel with the movable part rotational axis. Thereby, as understood from FIG. 10, the unit outlets 311, 312 are distributed substantially transversally in relation to the movable part rotation axis. Thereby, the vertical overlap of the unit outlets is eliminated, or kept small. Thereby, when the vessel is not moving, and only one of the engines is operating, the risk of exhaust gases from the operating engine entering the exhaust path of the non-operating engine, is eliminated. More specifically, in such a situation, the exhaust gases exiting any of the outlets will rise in the surround water, without passing the other of the unit outlets 311, 312.

The lower part 3171 of the movable wall 317 is removable. Thereby, access can be provided to the access space 2202 for reaching the propeller drive assembly. It should be noted however, that in some embodiments, the entire movable wall is fixed to the remainder of the movable part 220. In such embodiments, the movable part may be arranged so that access to the propeller drive assembly can be provided from where the propellers are located.

It should be noted that where the propulsion unit has one or more pushing propellers, one or more unit outlets may be provided in a propeller hub. Thereby, the exhaust gases may be guided through one or more of the one or more propellers.

It is to be understood that the present invention is not limited to the embodiments described above and illustrated in the drawings; rather, the skilled person will recognize that many changes and modifications may be made within the scope of the appended claims.

For example, one or more auxiliary exhaust conduit may be provided, to guide exhaust gases from the engines to one or more auxiliary exhaust outlets. The one or more auxiliary exhaust outlets may be located in the vessel hull, e.g. above the waterline. The one or more auxiliary exhaust conduits may be used when the vessel is not moving, or moving slowly, and the engines are idling, or are running at a rotational speed slightly above idling.

The invention claimed is:

1. A propulsion unit for a marine vessel, adapted to receive power from at least one power supply unit, wherein the propulsion unit comprises a stationary part adapted to be mounted to a hull of the marine vessel, and a movable part comprising one or more thrust generating devices adapted to transform the received power into a thrust by acting on water carrying the marine vessel, wherein the propulsion unit comprises two unit inlets each adapted to receive exhaust gases from a respective one of at least two internal combustion engines, wherein the stationary part comprises two stationary exhaust conduits each extending from a respective one of the unit inlets to the movable part, and wherein the movable part is adapted to release the exhaust gases into the water.

2. A propulsion unit according to claim 1, wherein the movable part comprises at least one unit outlet for releasing the exhaust gases into the water, and the propulsion unit is adapted to keep the exhaust gases separate along at least a part of a distance between the unit inlets and the unit outlet.

3. A propulsion unit according to claim 1, wherein the stationary part comprises two stationary outlets adapted to deliver the exhaust gases to the movable part.

4. A propulsion unit according to claim 3, wherein the movable part comprises two movable inlets each adapted to receive exhaust gases from a respective one of the stationary outlets.

5. A propulsion unit according to claim 3, wherein the movable part is rotatable in relation to the stationary part around a rotation axis for adjusting a direction of the thrust in relation to the hull, wherein the movable part comprises at least one movable inlet adapted to receive exhaust gases from the stationary outlets, wherein an extension, in a circumferential direction in relation to the rotational axis, of the movable inlet is larger than an extension, in the circumferential direction, of the stationary outlets.

6. A propulsion unit according to claim 1, wherein the movable part is rotatable in relation to the stationary part around a rotation axis for adjusting a direction of the thrust in relation to the hull, wherein the unit inlets are located at separate positions in a circumferential direction in relation to the rotation axis, wherein the stationary outlets are located at separate positions in a radial direction in relation to the rotation axis, wherein a stationary wall separating the stationary exhaust conduits is twisted along the stationary exhaust conduits.

7. A propulsion unit according to claim 1, wherein the movable part is rotatable in relation to the stationary part around a rotation axis for adjusting a direction of the thrust in relation to the hull, wherein the stationary part comprises a stationary wall separating the stationary exhaust conduits, wherein a distance, at the movable part, from the rotation axis to the stationary wall is constant along the stationary wall.

8. A propulsion unit according to claim 7, wherein the movable part comprises two movable exhaust conduits, wherein the movable part comprises a movable wall separating the movable exhaust conduits, wherein the movable wall coincides, at the stationary part, as seen along the rotation axis, with the stationary wall.

9. A propulsion unit according to claim 8, wherein the propulsion unit comprises a seal at an interface between the stationary part and the movable part, the seal being adapted to seal exhaust gases guided by one of the stationary exhaust conduits, and by one of the movable exhaust conduits, from exhaust gases guided by the other of the stationary exhaust conduits, and by the other of the movable exhaust conduits.

10. A propulsion unit according to claim 1, wherein the movable part comprises two movable exhaust conduits, each adapted to receive exhaust gases from a respective of the stationary exhaust conduits, wherein the movable exhaust conduits terminate at a respective of two unit outlets for releasing the exhaust gases into the water.

11. A propulsion unit according to claim 10, wherein the movable part is rotatable in relation to the stationary part around a rotation axis for adjusting the direction of the thrust in relation to the hull, and the two unit outlets are arranged to be distributed substantially transversally in relation to the movable part rotation axis.

12. A propulsion unit according to claim 10, wherein the movable part comprises a movable wall separating the movable exhaust conduits, wherein the unit outlets are formed at least partly by the movable wall, wherein at least a lower part of the movable wall is removable.

13. A propulsion system comprising a propulsion unit according to claim 1, and two internal combustion engines, the engines both being arranged to deliver power to the propulsion unit.

14. A marine vessel with a propulsion system according to claim 13.

* * * * *